(12) United States Patent
Li et al.

(10) Patent No.: US 10,564,926 B2
(45) Date of Patent: Feb. 18, 2020

(54) DUAL-VISION DISPLAY DEVICE AND DRIVING METHOD THEREOF

(71) Applicant: BOE TECHNOLOGY GROUP CO., LTD., Beijing (CN)

(72) Inventors: Wenbo Li, Beijing (CN); Wei Cao, Beijing (CN); Kai Lin, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/965,439

(22) Filed: Apr. 27, 2018

(65) Prior Publication Data

US 2019/0121601 A1   Apr. 25, 2019

(30) Foreign Application Priority Data

Oct. 19, 2017   (CN) .......................... 2017 1 0978780

(51) Int. Cl.
*G06F 3/16* (2006.01)
*G09G 5/14* (2006.01)
(Continued)

(52) U.S. Cl.
CPC .............. *G06F 3/165* (2013.01); *G09G 5/14* (2013.01); *H04N 5/04* (2013.01); *H04R 3/12* (2013.01);
(Continued)

(58) Field of Classification Search
CPC ...... G06F 3/165; G09G 5/14; G09G 2354/00; G09G 2380/16; H04N 5/04; H04R 1/323; H04R 1/403; H04R 3/12; H04R 2217/03; G06T 7/70; G06T 2207/30196; H04S 7/303; H04S 2400/11
See application file for complete search history.

(56) References Cited

U.S. PATENT DOCUMENTS

2006/0262185 A1 * 11/2006 Cha .......................... H04N 5/72
348/51
2010/0253917 A1 * 10/2010 Gao ..................... G02B 27/225
353/7
(Continued)

FOREIGN PATENT DOCUMENTS

CN        101248475 A      8/2008
CN        101470883 A      7/2009
(Continued)

OTHER PUBLICATIONS

First Chinese Office Action dated Mar. 5, 2019, received for corresponding Chinese Application No. 201710978780.0.

*Primary Examiner* — Michael E Teitelbaum
(74) *Attorney, Agent, or Firm* — Kinney & Lange, P.A.

(57) ABSTRACT

Embodiments of the present disclosure provide a dual-vision display device and a driving method thereof. The dual-vision display device includes: a first directional speaker and a second directional speaker. The first directional speaker is configured for directionally playing a first audio associated with a first video signal when a picture corresponding to the first video signal is viewed in the first view zone. The second directional speaker is configured for directionally playing a second audio associated with a second video signal when a picture corresponding to the second video signal is viewed in the second view zone.

19 Claims, 5 Drawing Sheets

(51) Int. Cl.
*H04N 5/04* (2006.01)
*H04R 3/12* (2006.01)
*H04R 1/40* (2006.01)
*G06T 7/70* (2017.01)

(52) U.S. Cl.
CPC ...... *G06T 7/70* (2017.01); *G06T 2207/30196* (2013.01); *G09G 2354/00* (2013.01); *G09G 2380/16* (2013.01); *H04R 1/403* (2013.01)

(56) References Cited

U.S. PATENT DOCUMENTS

2012/0086877 A1* 4/2012 Kaoh ............... H04N 21/42201
348/836
2013/0050196 A1* 2/2013 Takashima ......... G02B 27/2214
345/419

FOREIGN PATENT DOCUMENTS

| CN | 103002376 A | 3/2013 |
| CN | 105992099 A | 10/2016 |
| CN | 106954142 A | 7/2017 |
| WO | 2006024981 A1 | 3/2006 |

* cited by examiner

DUAL-VISION DISPLAY DEVICE AND DRIVING METHOD THEREOF

CROSS-REFERENCE TO RELATED APPLICATION(S)

This application claims the benefit of Chinese Patent Application No. 201710978780.0 filed on Oct. 19, 2017 in the State Intellectual Property Office of China, the disclosure of which is incorporated herein by reference in entirety.

BACKGROUND

Technical Field

Embodiments of the present disclosure relate to the field of display technology, and in particular, to a dual-vision display device and a driving method thereof.

Description of the Related Art

Dual-vision display refers to a display technology in which different images may be seen in two sides of the same display device, for example left side and right side. Different images correspond to different audio signals, thus users need to obtain respective audio signals when they view different images.

In the related art, in order to avoid interference between audio signals corresponding to different video images, the user needs to wear earphones to listen to the audio corresponding to the video image when viewing a video through a dual-vision system. However, the worn earphones will cause inconvenience to activities of the user during the viewing, and wearing the earphones for a long time will lead to head discomfort with poor user experiences.

SUMMARY

In a first aspect of the present disclosure, there is provided a dual-vision display device, comprising:

a first directional speaker configured for directionally playing a first audio associated with a first video signal according to a first view zone of the dual-vision display device; and a second directional speaker configured for directionally playing a second audio associated with a second video signal according to a second view zone of the dual-view display device.

Optionally, the dual-vision display device further comprises a positioning module configured for detecting a position of an object;

if it is detected that the position of the object is within the first view zone, the first directional speaker performs a directional playing according to the position; or if it is detected that the position of the object is within the second view zone, the second directional speaker performs a directional playing according to the position.

Optionally, the positioning module comprises a photographing unit and a processing unit;

the photographing unit is configured to acquire an image covering the first view zone and the second view zone; and the processing unit is configured to determine a position of the object in the first view zone and/or the second view zone according to a position of the object in the image.

Optionally, the dual-vision display device further comprises a sensing module;

the sensing module is configured to detect whether or not the object exists in a target area corresponding to the first view zone and a target area corresponding to the second view zone.

Optionally, the sensing module comprises an infrared sensor.

Optionally, the target area corresponding to the first view zone comprises the first view zone and a crosstalk zone adjacent to the first view zone; and the target area corresponding to the second view zone comprises the second view zone and a crosstalk zone adjacent to the second view zone.

Optionally, the first directional speaker is further configured to determine an adjustment range of a beam axis of the first directional speaker according to a viewing angle range of the first view zone and a beam divergence angle range of the first directional speaker;

the second directional speaker is further configured to determine an adjustment range of a beam axis of the second directional speaker according to a viewing angle range of the second view zone and a beam divergence angle range of the second directional speaker.

Optionally, the dual-vision display device is an electronic picture frame.

In a second aspect of the present disclosure, there is provided a driving method of a dual-vision display device for driving the dual-vision display device according to the embodiment in the first aspect, comprising:

loading the first video signal and the second video signal to the dual-vision display device; and playing the first audio associated with the first video signal directionally according to the first view zone and playing the second audio associated with the second video signal directionally according to the second view zone.

Optionally, the step of playing the first audio associated with the first video signal directionally according to the first view zone and playing the second audio associated with the second video signal directionally according to the second view zone comprises:

acquiring a position of an object;

if it is detected that the position of the object is within the first view zone, controlling the first directional speaker of the dual-vision display device to perform a directional playing according to the position; or if it is detected that the position of the object is within the second view zone, controlling the second directional speaker of the dual-vision display device to perform a directional playing according to the position.

Optionally, the step of acquiring the position of the object comprises:

acquiring an image of the first view zone and the second view zone detected by the dual-vision display device; and determining a position of the object in the first view zone and/or the second view zone according to a position of the object in the image.

Optionally, before acquiring the image of the first view zone and the second view zone detected by the dual-vision display device, the method further comprises:

determining whether or not it has been detected that the object exists in a target area corresponding to the first view zone and a target area corresponding to the second view zone.

Optionally, the step of controlling the first directional speaker of the dual-vision display device to perform the directional playing according to the position comprises:

in an adjustment range of a beam axis of the first directional speaker, adjusting a beam axis angle of the first directional speaker such that a beam of the first directional speaker covers the position; and driving the first directional speaker to play the first audio associated with the first video signal directionally.

Optionally, the step of controlling the second directional speaker of the dual-vision display device to perform the directional playing according to the position comprises:

in an adjustment range of a beam axis of the second directional speaker, adjusting a beam axis angle of the second directional speaker such that a beam of the second directional speaker covers the position; and driving the second directional speaker to play the second audio associated with the second video signal directionally.

In a third aspect of the present disclosure, there is provided a computer-readable storage medium having a computer program stored thereon, wherein the computer program, when executed by a processor, implements the driving method of the dual-vision display device according to according to the embodiment in the second aspect.

Additional aspects and advantages of the present disclosure will be partially set forth in the following description, will be apparent from the following description, or will be understood from the implementation of the embodiments of the present disclosure.

BRIEF DESCRIPTION OF THE DRAWINGS

The above and/or additional aspects and advantages of the embodiments of the present disclosure will become apparent and easily understood from the following description of the embodiments with reference to the accompanying drawings, in which.

DETAILED DESCRIPTION OF PREFERRED EMBODIMENTS

The embodiments of the present disclosure will be described in detail below, and examples of the embodiments are shown in the accompanying drawings. Throughout the description, same or similar reference numerals denote same or similar elements or elements having the same or similar functions. The embodiments described below with reference to the accompanying drawings are exemplary and are intended to explain the present disclosure, but should not be construed as limiting the present disclosure.

The dual-vision display device and the driving method thereof according to the embodiments of the present disclosure will be described below with reference to the drawings.

Figure 1:
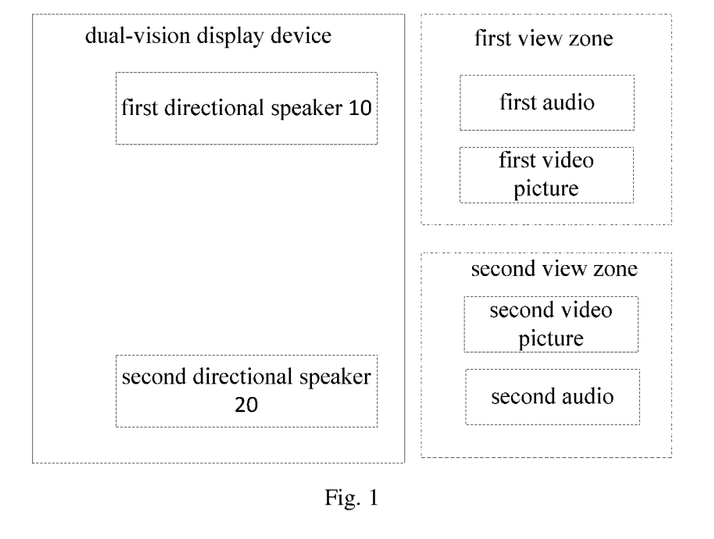
FIG. 1 is a schematic structural view of a dual-vision display device according to an embodiment of the present disclosure.

FIG. 1 is a schematic structural view of a dual-vision display device according to an embodiment of the present disclosure.

As shown in FIG. 1, the dual-vision display device includes a first directional speaker 10 and a second directional speaker 20.

Specifically, the first directional speaker 10 is configured for directionally playing a first audio associated with a first video signal when a picture corresponding to the first video signal is shown in the first view zone. The second directional speaker 20 is configured for directionally playing a second audio associated with a second video signal when a picture corresponding to the second video signal is shown in the second view zone.

When the first directional speaker 10 and the second directional speaker 20 perform audio playing, sound waves delivered are usually high-frequency ultrasonic waves having a small sound wave divergence angle so that the sound wave is propagated with strong directivity. That is to say, the first directional speaker 10 and the second directional speaker 20 adopt a directional playing mode.

It should be noted that, in FIG. 1, the first view zone and the second view zone are intended to explain that the dual-vision display device can generate the first view zone and the second view zone, and the picture corresponding to the first video signal and the picture corresponding to the second video signal may be displayed in the first view zone and the second view zone respectively. In this embodiment, the specific positions and ranges of the two view zones are not limited.

It is necessary for users synchronously to listen to the sound while watching the picture corresponding to the video signal. Therefore, each video signal has an audio that needs to be played in a synchronized manner. Herein, the audio and the video signal that need to be played in a synchronized manner are referred to as associated audio and video signal. That is, the first video signal has an associated first audio and the second video signal has an associated second audio.

Figure 2:
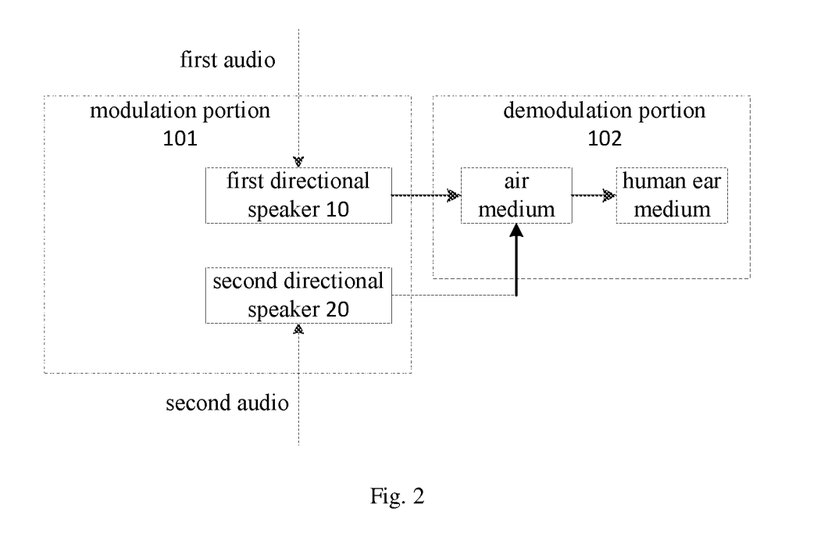
FIG. 2 is a schematic principle diagram of implementing a directional playing of sound according to an embodiment of the present disclosure.

As a possible implementation manner, in order to further clearly explain the principle that the first directional speaker 10 and the second directional speaker 20 play audio directionally, FIG. 2 is a schematic principle diagram of implementing a directional playing of sound according to an embodiment of the present disclosure, and specifically it includes a modulation portion 101 and a demodulation portion 102.

The modulation portion 101 is configured to modulate an inputted audio signal to obtain an ultrasonic wave. The modulation portion 101 includes the first directional speaker 10 and the second directional speaker 20. The principle that the first directional speaker 10 implements the directional playing is the same as that of the second directional speaker 20. In this embodiment, the first directional speaker 10 is taken as an example for description. As a possible implementation manner, the first directional speaker 10 is driven by an amplifier, the amplifier sends voltage to a metal polymer film of the first directional speaker 10, and then the metal polymer film is forced to vibrate in 60000 Hertz or higher frequency to generate the ultrasonic wave.

The demodulation portion 102 includes air medium and human ear medium, which can be regarded as a non-linear system and can convert the ultrasonic wave into an audible wave.

The ultrasonic wave emitted by the modulation portion 101 has high directivity. The difference frequency ultrasonic wave generated by the non-linear effect also has high directivity as the ultrasonic wave is propagated in the air medium, thereby the directional propagation of the sound can be realized, that is, a directional sound generation can be realized.

The working principle of the second directional speaker 20 is the same as that of the first directional speaker 10, therefore it will not be described again herein.

In the dual-vision display device according to the embodiment of the present disclosure, the first directional speaker is configured for playing a first audio associated with a first video signal when a picture corresponding to the first video signal is viewed in the first view zone. The second directional speaker is configured for playing a second audio associated with a second video signal when a picture corresponding to the second video signal is viewed in the second view zone. By providing the first directional speaker and the second directional speaker, directional playing audios may be obtained when viewing the corresponding video signals in different view zones. It at least partially solves the problem in the related art that it is necessary for the user to wear earphones to obtain the corresponding audio to avoid interference between different audios when viewing the videos corresponding to the different view zones by the dual-vision system.

Figure 3:
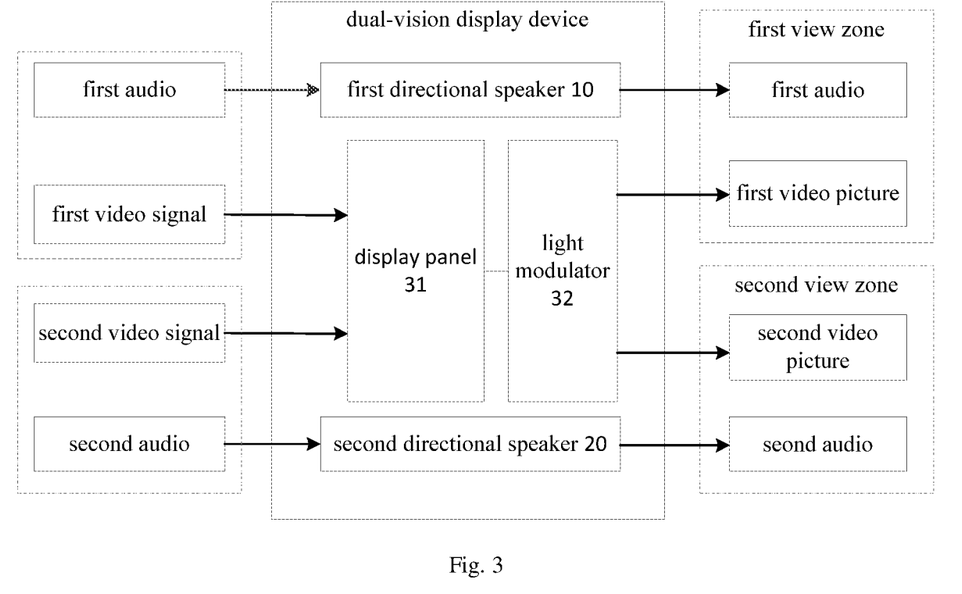
FIG. 3 is a schematic structural view of a dual-vision display device according to another embodiment of the present disclosure.

Based on the previous embodiment, in order to further clearly explain the structure of the dual-vision display device, an embodiment of the present disclosure proposes a possible implementation manner of a further dual-vision display device. FIG. 3 is a schematic structural view of a dual-vision display device according to another embodiment of the present disclosure.

As shown in FIG. 3, in order to enable the dual-vision display device to generate the first view zone and the second view zone which are different from each other, as a possible implementation manner, the dual-vision display device further includes a display panel 31 and a light modulator 32.

Specifically, the display panel 31 is configured to display according to the first video signal and the second video signal inputted by the dual-vision display device.

The light modulator 32 includes a grating and is disposed on a light exit side of the display panel 31. A light modulation is made to the picture displayed by the display panel 31 to form two view zones, i.e., the first view zone and the second view zone, and show a picture corresponding to the first video signal in the first view zone and a picture corresponding to the second video signal in the second view zone.

In an embodiment, the first view zone and the second view zone each have a corresponding viewing angle range. Within the viewing angle ranges corresponding to the first view zone and the second view zone, the picture corresponding to the first video signal and the picture corresponding to the second video signal may be viewed. The viewing angle ranges corresponding to the first view zone and the second view zone are predetermined by the display panel 31 and the light modulator 32.

The dual-vision display devices according to this embodiment and the previous embodiment can be applied to various display products, such as a television, an advertisement display screen, an electronic picture frame, and the like.

Figure 4:
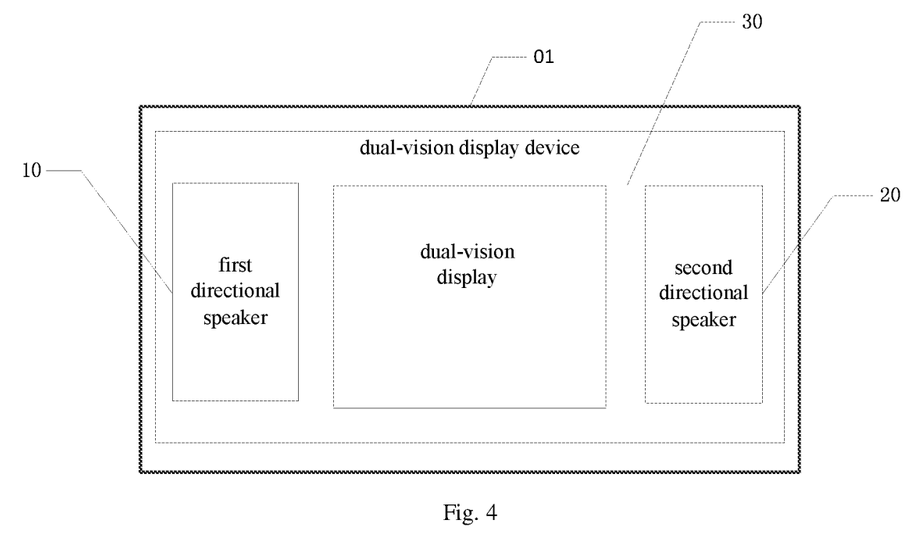
FIG. 4 is a schematic structural view of a dual-vision display device applied to an electronic picture frame according to an embodiment of the present disclosure.

Next, an electronic picture frame is taken as an example to describe the structure of the dual-vision display device in an actual product. FIG. 4 is a schematic structural view of a dual-vision display device applied to an electronic picture frame according to an embodiment of the present disclosure. As shown in FIG. 4, reference numeral 01 denotes a housing of the electronic picture frame, and a first directional speaker 10 and a second directional speaker 20 are disposed opposite to each other and are close to two opposite sides of the electronic picture frame respectively. A dual-vision display 30 is configured to display according to the first video signal and the second video signal inputted by the dual-vision display device of the electronic picture frame.

In the dual-vision display device according to the embodiment of the present disclosure, the first directional speaker is configured for playing a first audio associated with a first video signal when a picture corresponding to the first video signal is viewed in the first view zone. The second directional speaker is configured for playing a second audio associated with a second video signal when a picture corresponding to the second video signal is viewed in the second view zone. By providing the first directional speaker and the second directional speaker, a directional playing audio may be obtained when viewing the corresponding video signals in different view zones. It at least partially solves the problem in the related art that it is necessary for the user to wear earphones to obtain the corresponding audio to avoid interference between different audios when viewing the videos corresponding to the different view zones by the dual-vision system.

Figure 5A:
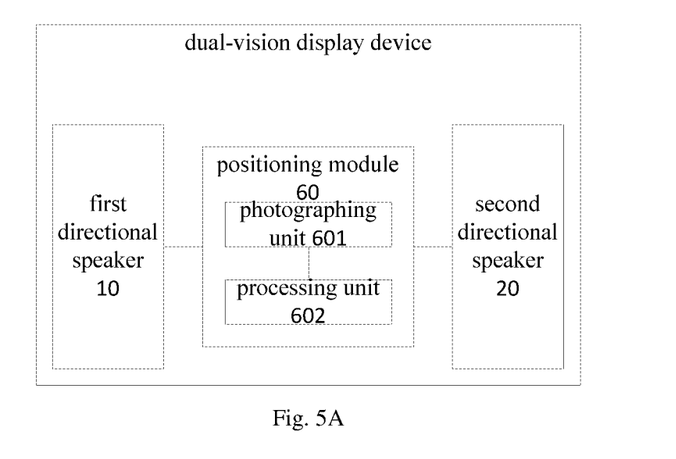
FIG. 5A is a schematic structural view of a dual-vision display device according to a further embodiment of the present disclosure.

In order to further clearly explain how to control the dual-vision display device to implement playing the audio corresponding to the view zone in different view zones in a directional manner, an embodiment of the present disclosure also propose a possible implementation manner of a further dual-vision display device, and FIG. 5A is a schematic structural view of a dual-vision display device according to a further embodiment of the present disclosure. As shown in FIG. 5A, based on the embodiment in FIG. 1, the dual-vision display device may further include a positioning module 60.

The positioning module 60 is configured to detect a position of an object. If it is detected that the position of the object is within the first view zone, the first directional speaker 10 performs a directional playing according to the position; or if it is detected that the position of the object is within the second view zone, the second directional speaker 20 performs a directional playing according to the position. The object herein refers to a person appearing in the first view zone and the second view zone.

Figure 5B:
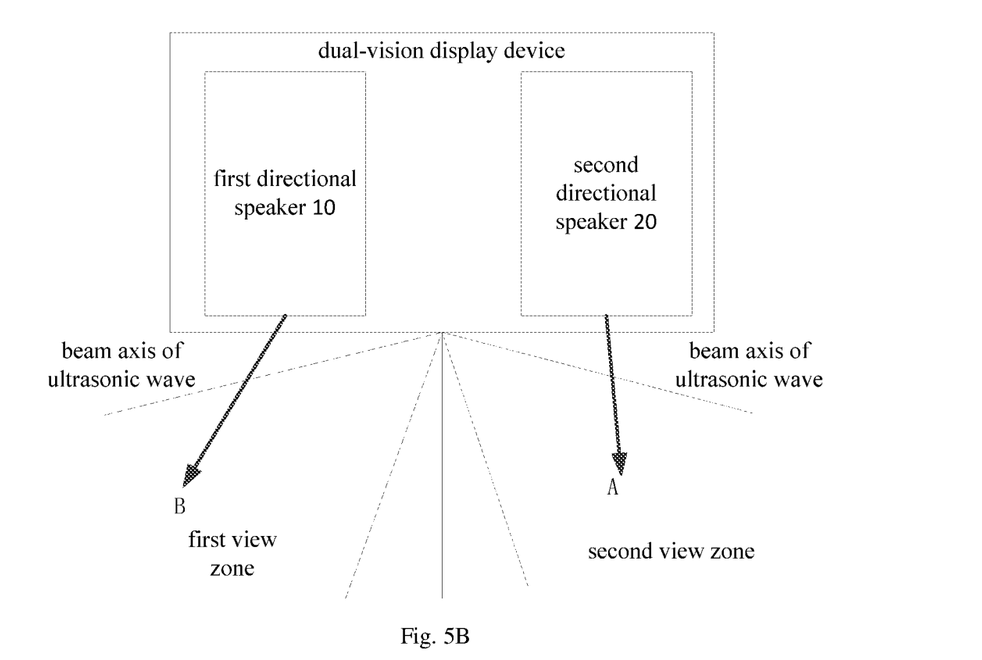
FIG. 5B is a schematic view showing directional playing of directional speakers according to an embodiment of the present disclosure.

FIG. 5B is a schematic view showing directional playing of the directional speakers according to an embodiment of the present disclosure. If it is detected that the position A of the person is within the first view zone shown in FIG. 5B, the first directional speaker 10 adjusts a beam axis angle of the ultrasonic wave such that the propagation path of the ultrasonic wave covers the position A of the person in FIG. 5B, and then emits the ultrasonic wave according to the adjusted beam axis angle to perform the directional playing according to the position. If it is detected that the position B of the person is within the second view zone shown in FIG. 5B, the second directional speaker 20 adjusts a beam axis angle of the ultrasonic wave such that the propagation path of the ultrasonic wave covers the position B of the person in FIG. 5B, and then emits the ultrasonic wave according to the adjusted beam axis angle to perform the directional playing according to the position.

In a possible application scene, if the position of the object is detected in both the first view zone and the second view zone, the first directional speaker 10 is driven to perform the directional playing according to the position of the object in the first view zone, while the second directional speaker 20 is driven to perform the directional playing according to the position of the object in the second view zone.

In another possible application scene, if the position of the object is only detected in the first view zone, only the first directional speaker 10 is driven to perform the directional playing according to the position of the object in the first view zone.

In a further possible application scene, if the position of the object is only detected in the second view zone, only the second directional speaker 20 is driven to perform the directional playing according to the position of the object in the second view zone.

Further, the positioning module 60 may include a photographing unit 601 and a processing unit 602;

Specifically, the photographing unit 601 is configured to acquire an image covering the first view zone and the second view zone. The processing unit 602 is configured to determine the position of the object in the first view zone and/or the second view zone according to the position of the object in the image.

As a possible implementation manner, the photographing unit 601 may be one camera, which may simultaneously capture images in the first view zone and the second view zone, or two cameras, one of which is used for capturing the image in the first view zone, and the other of which is used for capturing the image in the second view zone.

As a possible implementation manner, the processing unit 602 may be an image processor. If the object is a person, the processing unit 602 acquires the image captured by the photographing unit 601 and then performs face recognition. The position correspondence between each pixel in the captured image and the first view zone or the second view zone may be calibrated in advance. After a relative position of a face region in the image is recognized, the position of the person in the first view zone or the second view zone may be determined based on the recognized relative position.

The dual-vision display device in this embodiment may be applied to an electronic product, such as an electronic picture frame, and the electronic picture frame may be applied in many scenes, such as a display store. The electronic picture frame with such a dual-vision display device can respectively display different sales promotion videos in the first view zone and the second view zone of the electronic picture frame. When a consumer enters the first view zone or the second view zone, the position of the consumer may be determined, and then the corresponding audio may be played. When the consumer leaves the corresponding view zone, the audio sound disappears immediately. For example, the video played in the first view zone is an ampoule essence newly released by a brand, when a consumer enters the first view zone, the audio heard is related to an introduction about efficiency and usage of the ampoule essence. At the same time, whitening essence of another brand is played in the second view zone, when a consumer enters the second view zone, the audio heard is related to an introduction about the whitening essence. The electronic picture frame plays two completely different videos in different view zones at the same time. However, when the consumer is in different view zones, he/she hears different audios, and after leaving the view zones, the sound disappears. Further, the audios corresponding to the different view zones will not interfere with each other, and they will not cause noise interference to the surrounding environment. It at least partially achieves the effect that, when watching videos in different view zones, without wearing earphones, the audio corresponding to the video in the view zone may be heard without interference, thereby improving user experience and convenience.

It should be noted that the dual-vision display device may also be applied to other electronic products, which will not be described herein in detail.

In the dual-vision display device according to the embodiment of the present disclosure, by providing the first directional speaker and the second directional speaker, a directional playing audio may be obtained when viewing the corresponding video signals in different view zones. It at least partially solves the problem in the related art that it is necessary for the user to wear earphones to obtain the corresponding audio and avoid interference between different audios when viewing the videos corresponding to the different view zones by the dual-vision system. Further, the positioning module may further determine the position of the object in the first view zone and the second view zone, adjust the beam axis angles of the first directional speaker and the second directional speaker according to the position of the object, so that the sound can cover the position of the object and it has the best sound effects, thereby improving the user experience.

Figure 6:
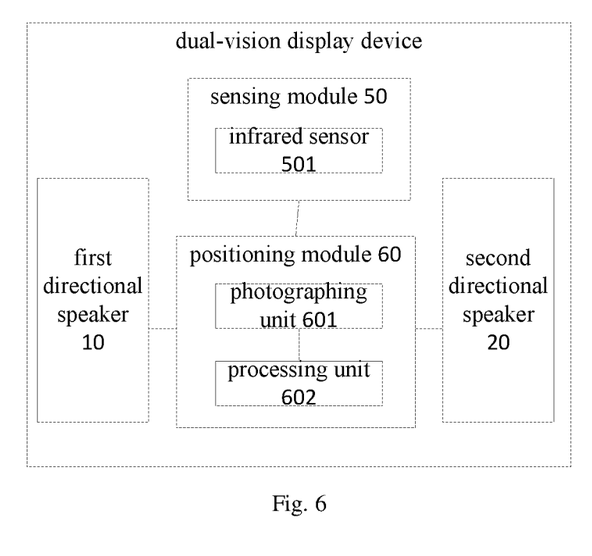
FIG. 6 is a schematic structural view of a dual-vision display device according to a still further embodiment of the present disclosure.

In the previous embodiment, the position of the object in the first view zone and the second view zone is determined by the positioning module, and the first directional speaker and the second directional speaker perform the directional playing according to the determined position of the object. In this way, the positioning module needs to be in the state of image acquisition all the time, thereby the power consumption is large. To this end, based on the embodiment shown in FIG. 5A, an embodiment of the present disclosure further provides a possible implementation manner of a dual-vision display device. A sensing module is added to detect whether or not the object exists in a target area corresponding to the first view zone and a target area corresponding to the second view zone. If there is an object (for example, a person) in the target areas, the positioning module is activated to position the object. FIG. 6 is a schematic structural view of a dual-vision display device according to a still further embodiment of the present disclosure. The device may further include a sensing module 50, which is configured to detect whether or not the object exists in a target area corresponding to the first view zone and a target area corresponding to the second view zone. If a user object is detected, the positioning module 60 is activated.

As a possible implementation manner, the sensing module 50 includes an infrared sensor 501, which is configured to detect whether a person exists in a target area corresponding to the first view zone and a target area corresponding to the second view zone. If a person is detected, then the positioning module is activated. Specifically, if it is detected by the infrared sensor 501 that there is a person in the target area corresponding to the first view zone, the positioning module 60 is activated to determine the position of the person in the first view zone. If it is detected by the infrared sensor 501 that there is a person in the target area corresponding to the second view zone, the positioning module 60 is activated to determine the position of the person in the second view zone. If it is detected by the infrared sensor 501 that there is a person in each of the target area corresponding to the first view zone and the target area corresponding to the second view zone, the positioning module 60 is activated to determine the position of the person in the first view zone and the position of the person in the second view zone.

The sensing module 50 detects whether there is a person in the target area corresponding to the first view zone and the target area corresponding to the second view zone, and the positioning module 60 is only activated when there is a person in the target zone corresponding to the first view zone and/or the target area corresponding to the second view zone. In this way, it at least partially avoids the problem of high power consumption caused by long-time working of the positioning module 60, and therefore it effectively saves the power consumption of the product.

Figure 7:
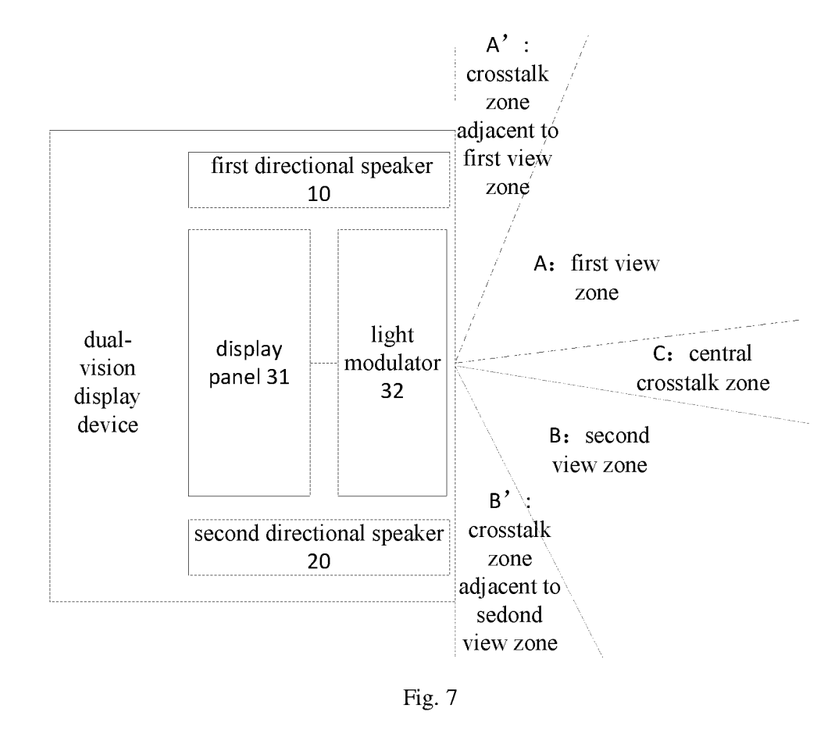
FIG. 7 is a schematic view of a view zone and a crosstalk zone adjacent to the view zone according to an embodiment of the present disclosure.

The target area corresponding to the first view zone includes the first view zone and a crosstalk zone adjacent to the first view zone, and the target area corresponding to the second view zone includes the second view zone and a crosstalk zone adjacent to the second view zone. FIG. 7 is a schematic view of view zones and crosstalk zones adjacent to the view zones according to an embodiment of the present disclosure, zone A is the first view zone, zone A' is the crosstalk zone adjacent to the first view zone, zone B is the second view zone, zone B' is the crosstalk zone adjacent to the second view zone, and zone C is a central crosstalk zone (i.e., not only the crosstalk zone adjacent to the first view zone, but also the crosstalk zone adjacent to the second view zone). By setting the target area to be larger than the corresponding view zone, it allows to activate the positioning module 60 in advance to detect the position of the object when the object enters the target area corresponding to the first view zone or the second view zone, thereby when it is detected by the positioning module 60 that the object is entering the first view zone or the second view zone, the first directional speaker 10 and the second directional speaker 20 are driven to perform the directional playing according to the acquired position information, reducing the delay.

As a possible implementation manner, the angle of the first view zone A shown in FIG. 7 is greater than 50 degrees, the angle of the crosstalk zone A' adjacent to the first view zone is greater than 10 degrees and less than 30 degrees, and the angle of the central crosstalk zone C is less than 10 degrees, the crosstalk zone B' adjacent to the second view zone is greater than 10 degrees and less than 30 degrees, and the second view zone B is greater than 50 degrees.

It should be noted that, the first view zone, the crosstalk zone adjacent to the first view zone, the central crosstalk zone, the crosstalk zone adjacent to the second view zone, and the second view zone in FIG. 7 are merely exemplary, they are not limited to the angle and the range as shown in FIG. 7, but may be adjusted and set by those skilled in the art according to actual conditions.

As a possible implementation manner in this embodiment, the first directional speaker 10 is further configured to adjust a beam divergence angle of the first directional speaker 10 according to a viewing angle range of the first view zone, so as to determine an adjustment range of a beam axis of the first directional speaker 10, which is less than the viewing angle range. Also, in the adjustment range of the beam axis, the beam axis angle of the first directional speaker 10 is adjusted such that the beam of the first directional speaker 10 covers the position of the object determined by the positioning module 60, thereby the object can hear the first audio signal played by the first directional speaker at this position.

Similarly, the second directional speaker 20 is further configured to adjust a beam divergence angle of the second directional speaker 20 according to a viewing angle range of the second view zone, so as to determine an adjustment range of a beam axis of the second directional speaker 20. Also, in the adjustment range of the beam axis, the beam axis angle of the second directional speaker 20 is adjusted such that the beam of the second directional speaker 20 covers the position of the object determined by the positioning module 60, thereby the object can hear the second audio signal played by the second directional speaker at this position.

In the dual-vision display device according to the embodiment of the present disclosure, by providing the first directional speaker and the second directional speaker, a directional playing audio may be obtained when viewing the corresponding video signals in different view zones. It at least partially solves the problem in the related art that it is necessary for the user to wear earphones to obtain the corresponding audio and avoid interference between different audios when viewing the videos corresponding to the different view zones by the dual-vision system. In addition, providing the positioning module can further determine the position of the object in different view zones, thus the orientation of the directional playing is more accurate. Further, by providing the sensing module, it may detect whether there is a person in the target areas corresponding to the different view zones. If there is a person, the positioning module is activated, thereby it at least partially effectively reduces the power consumption generated by the positioning module and effectively reduces the whole power consumption.

Figure 8:
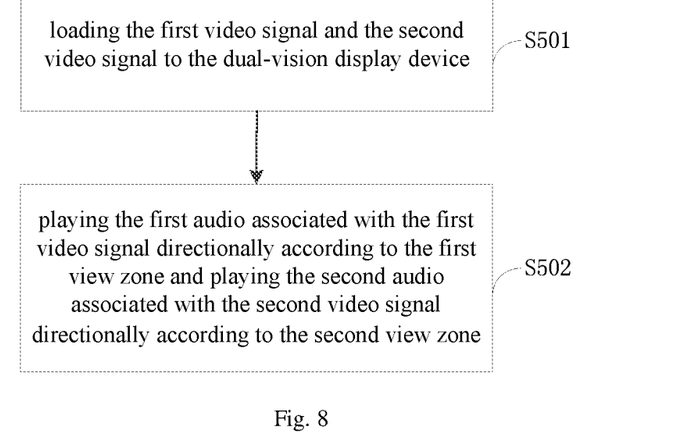
FIG. 8 is a schematic flowchart of a driving method of a dual-vision display device according to an embodiment of the present disclosure.

Based on the above embodiments, an embodiment of the present disclosure further proposes a driving method of a dual-vision display device, the driving method acts on the dual-vision display device to drive the dual-vision display device to allow video images to be viewed in different view zones while the corresponding audio signal may be directly obtained without wearing earphones. FIG. 8 is a schematic flowchart of a driving method of a dual-vision display device according to an embodiment of the present disclosure, the driving method may include:

Step S501: loading the first video signal and the second video signal to the dual-vision display device.

Specifically, the first video signal and the second video signal are loaded to the dual-vision display device and the display panel of the dual-vision display device is configured to display the first video signal and the second video signal. The light exit side of the display panel is further provided with a light modulator. The light modulator includes a grating for light modulation for a picture displayed by the display panel, as shown in FIG. 3, so as to show a picture corresponding to the first video signal in the first view zone and a picture corresponding to the second video signal in the second view zone.

Step S502: playing the first audio associated with the first video signal directionally according to the first view zone and playing the second audio associated with the second video signal directionally according to the second view zone.

Specifically, the dual-vision display device firstly obtains the position of the object, and controls the first directional speaker of the dual-vision display device to perform a directional playing according to the position of the object if the position of the object is within the first view zone, and controls the second directional speaker of the dual-vision display device to perform a directional playing according to the position of the object if the position of the object is within the second view zone. If there are objects in the first view zone and the second view zone, the positions of the objects in the first view zone and the second view zone are obtained respectively, the first directional speaker is controlled to perform a directional playing according to the position of the object in the first view zone, and the second directional speaker is controlled to perform a directional playing according to the position of the object in the second view zone.

As a possible implementation manner, the dual-vision display device may firstly detect whether there is an object in a target range of the first view zone or in a target range of the second view zone, and then acquire the position of the object if an object is detected, and then drive the directional speaker to perform the directional playing according to the position of the object. Herein the implementation method is the same as the previous paragraph, therefore it will not be repeated.

In the driving method of the dual-vision display device according to the embodiment of the present disclosure, the dual-vision display device is loaded with the first video signal and the second video signal, so as to directionally play the first audio associated with the first video signal when the picture corresponding to the first video signal is viewed in the first view zone and directionally play the second audio associated with the second video signal when the picture corresponding to the second video signal is viewed in the second view zone. Thereby, a directional playing audio may be obtained when viewing the corresponding video signals in different view zones. It at least partially solves the problem in the related art that it is necessary for the user to wear earphones to obtain the corresponding audio and avoid interference between different audios when viewing the videos corresponding to the different view zones by the dual-vision system.

Figure 9:
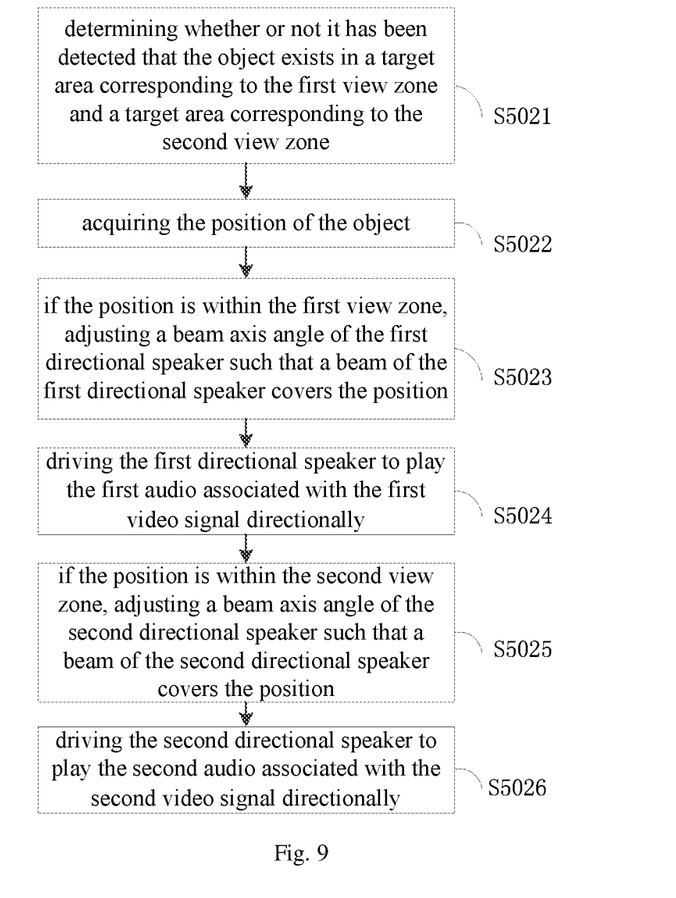
FIG. 9 is a schematic flowchart of a driving method of a dual-vision display device according to another embodiment of the present disclosure.

FIG. 9 is a schematic flowchart of a driving method of a dual-vision display device according to another embodiment of the present disclosure. Based on the previous embodiment, this embodiment further clearly explains the process of determining whether there is an object in different views firstly, and further determining the position of the object, and then implementing the directional playing of audio in different view zones according to the position of the object. As shown in FIG. 9, the step S502 may further include the following steps:

Step S5021: determining whether or not it has been detected that the object exists in a target area corresponding to the first view zone and a target area corresponding to the second view zone.

Specifically, the dual-vision display device is provided with a sensing module. By means of the sensing module, it can detect whether there is an object entering the target area of the first view zone or the target area of the second view zone. As a possible implementation manner, the sensing module may include an infrared sensor. The infrared sensor detects whether there are infrared rays emitted by a human body in the target area, and after detecting the infrared rays emitted by the human body, it is determined by the sensing module that the object is detected.

Step S5022: acquiring the position of the object.

After it is determined by the dual-vision display device that the object is detected, the positioning module is activated to acquire the position of the object. Specifically, the positioning module may capture the image of the first view zone and the second view zone, and determine the position of the object in the first view zone and/or the second view zone according to the position of the object in the image.

Step S5023: if the position is within the first view zone, adjusting a beam axis angle of the first directional speaker such that a beam of the first directional speaker covers the position.

Specifically, if it is determined that the position is within the first view zone, the beam axis angle of the first directional speaker is adjusted such that the beam of the first directional speaker covers the position of the object according to an adjustment range of the beam axis of the first directional speaker Step S5024: driving the first directional speaker to play the first audio associated with the first video signal directionally.

Specifically, the beam axis angle of the first directional speaker is adjusted according to the position of the object, and then the first directional speaker is driven to play the first audio associated with the first video signal according to the beam axis angle.

Step S5025: if the position is within the second view zone, adjusting a beam axis angle of the second directional speaker such that a beam of the second directional speaker covers the position.

Specifically, if it is determined that the position is within the second view zone, the beam axis angle of the second directional speaker is adjusted such that the beam of the second directional speaker covers the position of the object according to an adjustment range of the beam axis of the second directional speaker Step S5026: driving the second directional speaker to play the second audio associated with the second video signal directionally.

Specifically, the beam axis angle of the second directional speaker is adjusted according to the position of the object, and then the second directional speaker is driven to play the second audio associated with the second video signal according to the beam axis angle.

In the driving method of the dual-vision display device according to the embodiment of the present disclosure, the dual-vision display device is loaded with the first video signal and the second video signal, so as to directionally play the first audio associated with the first video signal when the picture corresponding to the first video signal is viewed in the first view zone and directionally play the second audio associated with the second video signal when the picture corresponding to the second video signal is viewed in the second view zone. Thereby, a directional playing audio may be obtained when viewing the corresponding video signals in different view zones. It at least partially solves the problem in the related art that it is necessary for the user to wear earphones to obtain the corresponding audio and avoid interference between different audios when viewing the videos corresponding to the different view zones by the dual-vision system. Further, it is determined whether there is an object in the view zones firstly, and then the position of the object is determined, and the directional speakers can adjust the beam axis and the beam range so that the audio can cover the position of the object, thereby the sound effect is better and the transmitting power of the directional speakers may be saved.

In order to implement the above embodiments, an embodiment of the present disclosure further provides a computer-readable storage medium having a computer program stored thereon, wherein the computer program, when executed by a processor, implements the driving method of the dual-vision display device according to the above embodiments.

The dual-vision display device and the driving method thereof according to the embodiments of the present disclosure avoid interference between different audios by playing corresponding audios in different view zones respectively, without wearing earphones.

In the description of the specification, the terms "an embodiment", "some embodiments", "an example", "a specific example", or "some examples" and the like means that the specific features, structures, materials, or features described in connection with the embodiment or example are included in at least one embodiment or example of the present disclosure. In the present specification, a schematic expression of the above terms does not necessarily refer to the same embodiment or example. Furthermore, the specific features, structures, materials, or features described may be combined in any suitable manner in any one or more of the embodiments or examples. In addition, different embodiments or examples described in this specification and features of different embodiments or examples may be incorporated and combined by those skilled in the art unless there is mutual contradiction.

In addition, the terms "first" and "second" are only descriptive, but should not be construed as indicating or implying relative importance or implicitly indicating the number of the discussed technical features. Thus, the features with definition of "first" and "second" may explicitly or implicitly include at least one of the features. In the description of the present disclosure, "a plurality of" means "at least two", for example, two, three, etc., unless expressly limited otherwise.

Any process or method descriptions described in flowcharts or in other ways herein may be understood as representing modules, segments or portions including one or more code for implementing executable instructions of a customized logic function or steps of a process, and the scope of optional embodiments of the present disclosure includes additional implementations in which the function may be performed other than the order shown or discussed, including in a substantially simultaneous manner or in reverse order depending on the function involved, which should be understood by those skilled in the art to which the embodiments of the present disclosure belong.

Logics and/or steps, which are represented in the flowcharts or described in other ways herein, for example, may be considered as a sequencing list of executable instructions for implementing logic functions, which may be embodied in any computer-readable medium for being used by or in connection with an instruction execution system, apparatus or device (such as a computer-based system, a processor-included system, or other systems which can obtain instructions from an instruction execution system, apparatus or device and execute the instructions). For the purpose of description, "computer-readable medium" may be any apparatus that can contain, store, communicate, propagate, or transmit a program for being used by or in connection with an instruction execution system, apparatus or device. More specific examples of the computer-readable medium non-exhaustively include the following: an electrical connection portion (electronic device) having one or more wires, a portable computer disk cartridge (magnetic device), a random access memory (RAM), a read only memory (ROM), an erasable programmable read only memory (EPROM or flash memory), an optical fiber device, and a compact disc read only memory (CDROM). In addition, the computer-readable medium may even be a paper or other suitable media upon which the program can be printed, because the program may be electronically obtained for example by optically scanning the paper or other media and then editing, interpreting or processing in other suitable ways if appropriate, and then stored in a computer memory.

It should be understood that various portions of the present disclosure may be implemented in hardware, software, firmware, or a combination thereof. In the above embodiments, multiple steps or methods may be implemented by software or firmware stored in a memory and executed by a suitable instruction execution system. For example, if implemented in hardware, as in another embodiment, it may be implemented using any one of the following techniques well known in the art or a combination thereof: a discrete logic circuit with logic gates for implementing logic functions for data signals, a specific integrated circuit with suitable combinational logic gates, an programmable gate array (PGA), a field programmable gate array (FPGAs), and the like.

It may be appreciated by those skilled in the art that all or part of the steps in the method according to the above embodiments may be implemented by a program instructing relevant hardware. The program may be stored in a computer-readable storage medium. When executed, the program includes one of the steps of the method according to the above embodiments or a combination thereof.

In addition, all the functional units in various embodiments of the present disclosure may be integrated in one processing module, or each of the units may exist separately and physically, and two or more units may be integrated in one module. The above-described integrated module may be implemented in the form of hardware or in the form of software functional module. If the integrated module is implemented in the form of software functional module and is sold or used as an independent product, the integrated module may also be stored in a computer-readable storage medium.

The above-described storage medium may be a read only memory, a magnetic disk, an optical disk, or the like. Although the embodiments of the present disclosure have been shown and described above, it should be understood that the above embodiments are merely exemplary and should not be construed as limiting the present disclosure. Changes, modifications, replacements or variances may be made to the above embodiments by those skilled in the art within the scope of the present disclosure.

What is claimed is:

1. A dual-vision display device, comprising:
    a first directional speaker configured for directionally playing first audio associated with a first video signal according to a first view zone of the dual-vision display device; and
    a second directional speaker configured for directionally playing second audio associated with a second video signal according to a second view zone of the dual-view display device,
    wherein:
    the first directional speaker is further configured to determine an adjustment range of a beam axis of the first directional speaker according to a viewing angle range of the first view zone and a beam divergence angle range of the first directional speaker; and
    the second directional speaker is further configured to determine an adjustment range of a beam axis of the second directional speaker according to a viewing angle range of the second view zone and a beam divergence angle range of the second directional speaker.

2. The dual-vision display device according to claim 1, further comprising a positioning module configured for detecting a position of an object, wherein:
if it is detected that the position of the object is within the first view zone, the first directional speaker performs a directional playing according to the position; or
if it is detected that the position of the object is within the second view zone, the second directional speaker performs a directional playing according to the position.

3. The dual-vision display device according to claim 2, wherein the positioning module comprises a photographing unit and a processing unit, and wherein:
the photographing unit is configured to acquire an image covering the first view zone and the second view zone; and
the processing unit is configured to determine a position of the object in the first view zone and/or the second view zone according to a position of the object in the image.

4. The dual-vision display device according to claim 2, further comprising a sensing module, wherein:
the sensing module is configured to detect whether or not the object exists in a target area corresponding to the first view zone and a target area corresponding to the second view zone.

5. The dual-vision display device according to claim 4, wherein the sensing module comprises an infrared sensor.

6. The dual-vision display device according to claim 4, wherein:
the target area corresponding to the first view zone comprises the first view zone and a crosstalk zone adjacent to the first view zone; and
the target area corresponding to the second view zone comprises the second view zone and a crosstalk zone adjacent to the second view zone.

7. The dual-vision display device according to claim 3, further comprising a sensing module, wherein:
the sensing module is configured to detect whether or not the object exists in a target area corresponding to the first view zone and a target area corresponding to the second view zone.

8. The dual-vision display device according to claim 7, wherein the sensing module comprises an infrared sensor.

9. The dual-vision display device according to claim 8, wherein,
the target area corresponding to the first view zone comprises the first view zone and a crosstalk zone adjacent to the first view zone; and
the target area corresponding to the second view zone comprises the second view zone and a crosstalk zone adjacent to the second view zone.

10. The dual-vision display device according to claim 1, wherein the dual-vision display device is an electronic picture frame.

11. A driving method for driving the dual-vision display device according to claim 1, comprising:
loading the first video signal and the second video signal to the dual-vision display device; and
playing the first audio associated with the first video signal directionally according to the first view zone and playing the second audio associated with the second video signal directionally according to the second view zone.

12. The driving method according to claim 11, wherein the step of playing the first audio associated with the first video signal directionally according to the first view zone and playing the second audio associated with the second video signal directionally according to the second view zone comprises:
acquiring a position of an object; and
if it is detected that the position of the object is within the first view zone, controlling the first directional speaker of the dual-vision display device to perform a directional playing according to the position; or
if it is detected that the position of the object is within the second view zone, controlling the second directional speaker of the dual-vision display device to perform a directional playing according to the position.

13. The driving method according to claim 12, wherein the step of acquiring the position of the object comprises:
acquiring an image of the first view zone and the second view zone detected by the dual-vision display device; and
determining the position of the object in the first view zone and/or the second view zone according to a position of the object in the image.

14. The driving method according to claim 13, wherein before acquiring the image of the first view zone and the second view zone detected by the dual-vision display device, the method further comprises:
determining whether or not it has been detected that the object exists in a target area corresponding to the first view zone and a target area corresponding to the second view zone.

15. The driving method according to claim 12, wherein the step of controlling the first directional speaker of the dual-vision display device to perform the directional playing according to the position comprises:
in the adjustment range of the beam axis of the first directional speaker, adjusting a beam axis angle of the first directional speaker such that a beam of the first directional speaker covers the position; and
driving the first directional speaker to play the first audio associated with the first video signal directionally.

16. The driving method according to claim 12, wherein the step of controlling the second directional speaker of the dual-vision display device to perform the directional playing according to the position comprises:
in the adjustment range of the beam axis of the second directional speaker, adjusting a beam axis angle of the second directional speaker such that a beam of the second directional speaker covers the position; and
driving the second directional speaker to play the second audio associated with the second video signal directionally.

17. The driving method according to claim 14, wherein the step of controlling the first directional speaker of the dual-vision display device to perform the directional playing according to the position comprises:
in the adjustment range of the beam axis of the first directional speaker, adjusting a beam axis angle of the first directional speaker such that a beam of the first directional speaker covers the position; and
driving the first directional speaker to play the first audio associated with the first video signal directionally.

18. The driving method according to claim 17, wherein the step of controlling the second directional speaker of the dual-vision display device to perform the directional playing according to the position comprises:

in the adjustment range of the beam axis of the second directional speaker, adjusting a beam axis angle of the second directional speaker such that a beam of the second directional speaker covers the position; and driving the second directional speaker to play the second audio associated with the second video signal directionally.

19. A computer-readable storage medium having a computer program stored thereon, wherein the computer program, when executed by a processor, implements the driving method for driving the dual-vision display device according to claim 11.

* * * * *